Nov. 6, 1945.   J. H. NUFFER ET AL   2,388,280
SUCTION CLEANER
Filed Sept. 27, 1943

Inventors
Joseph H. Nuffer
Lynn H. Latta
By Malcolm W. Fraser   Attorney

Patented Nov. 6, 1945

2,388,280

UNITED STATES PATENT OFFICE 2,388,280

SUCTION CLEANER

Joseph H. Nuffer, Toledo, Ohio, and Lynn H. Latta, Deerfield, Ill., assignors to Air-Way Electric Appliance Corporation, Toledo, Ohio, a corporation of Delaware Application September 27, 1943, Serial No. 503,917

1 Claim. (Cl. 15—14)

This invention relates to suction cleaners of the type in which the filtering and suction units are both enclosed within a rigid housing to which a dust-laden air stream is lead through a flexible suction hose from a cleaning tool. One of the objects of the invention is to provide a suction cleaner of this type wherein the filtering unit has the advantage of being arranged vertically or substantially vertically and the hose is connected to the housing in such a position as to attain maximum efficiency in the conveyance of a dust-laden air stream into the filtering and collecting unit, and yet the center of gravity of the entire body of the cleaner is sufficiently low and the weight is sufficiently distributed horizontally so that the cleaner body may be dragged about by the suction hose without being tipped over by the pull of the hose.

Another object of the invention is to provide such a cleaner wherein the suction unit is coupled closely to the filtering and dust collecting unit so as to obtain maximum efficiency in the application of suction to the filtering unit. A further object is to provide an arrangement wherein the space within a streamlined housing, such as, for example, of "tear drop" shape, is utilized so as to obtain maximum compactness. Another object is to provide a cleaner of the type indicated wherein both the filtering and suction units can be quickly and easily exposed for servicing, and wherein a sealed connection between the suction hose and filtering unit may be easily and readily established.

Toward the attainment of the foregoing objects, the invention contemplates an arrangement wherein the filtering and suction units are mounted side by side upon a base and enclosed between the base and a dome shaped cover member which is adapted to be moved to a position wherein the suction and filtering units are completely or almost completely exposed above the base. In one form of the invention the cover is provided with means for establishing a sealed connection between the suction hose and the filtering unit as an incident to the closing of the cover. In a modification of the invention, a separate cover is provided for this purpose.

The invention is particularly characterized by the arrangement of the suction unit on an inclined axis, with the inlet end of the suction unit extending in to the corner between the base and the upright filtering units, and with the fan portion of the suction unit disposed at the upper end thereof, adjacent to the wall of the cover.

Another object of the invention is to provide a vacuum cleaner which in addition to the characteristics set forth above, has provision for a blower connection direct to the suction unit when the cover is closed, and also provides an improved valve mechanism for cutting off the normal discharge and concentrating the discharge at the blower connection.

These and other objects of the invention will become apparent from a perusal of the following specifications taken in connection with the accompanying drawing, in which.

Figure 1:
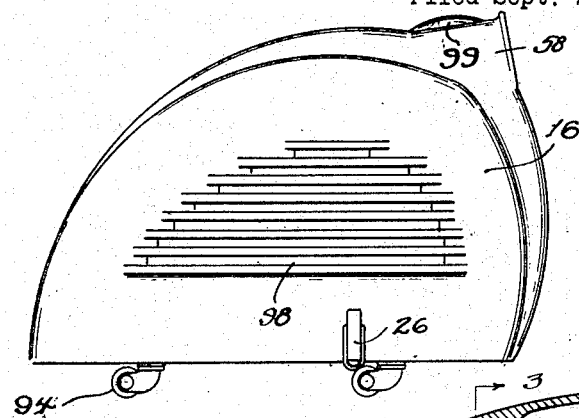
Fig. 1 is a side elevation of a suction cleaner incorporating the invention.
Figure 2:
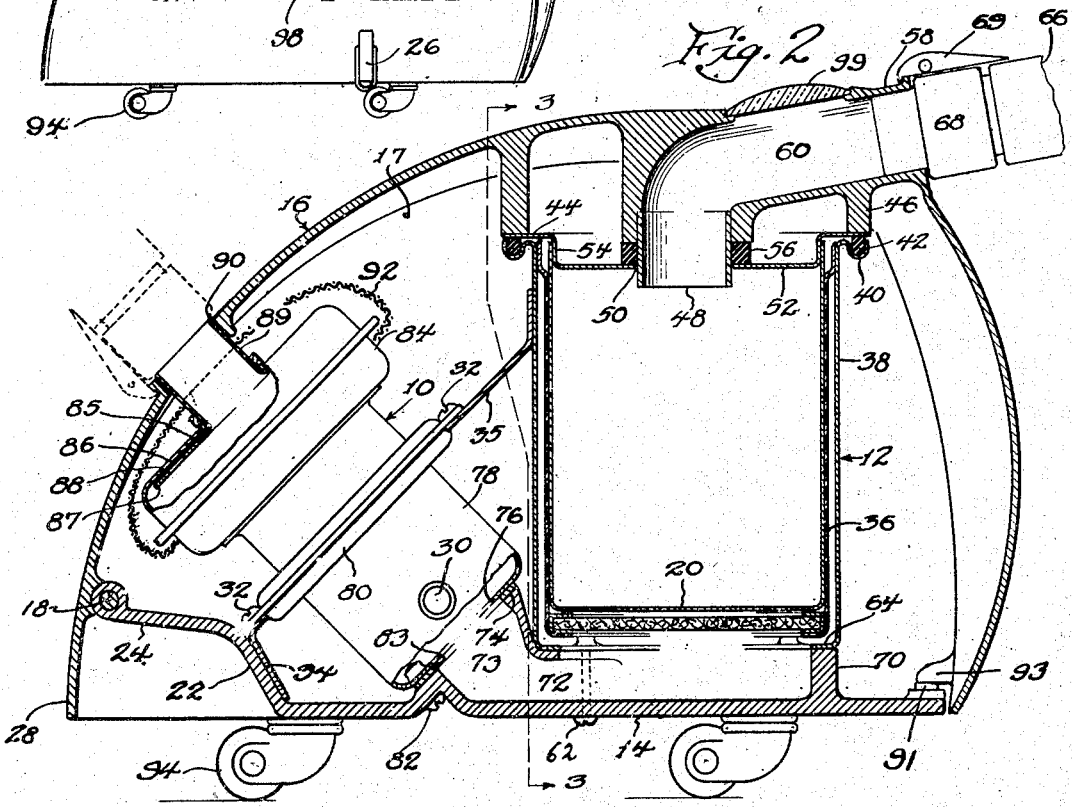
Fig. 2 is a longitudinal sectional view through the same.
Figure 3:
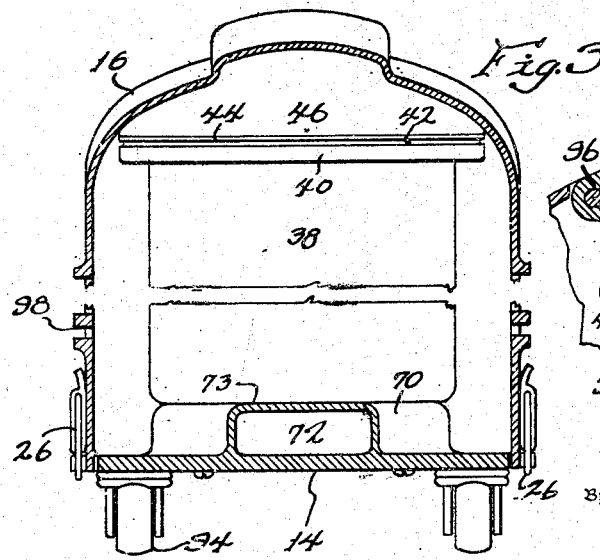
Fig. 3 is a transverse sectional view through the same taken on the line 33 of Fig. 2

As an example of one form in which the invention may be embodied, we have shown in the drawing the body portion of a suction cleaner embodying a suction unit 10 and filtering unit 12 mounted side by side upon a base 14. A cover 16 cooperates with the base 14 to form a housing defining a chamber 17 in which the suction and filtering units 10 and 12 are enclosed. The cover 16 is hinged to the base 14 by means of a hinge 18. The base 14 has an upwardly offset portion 22 and a raised portion 24 extending rearwardly from the offset portion 22, the hinge 18 being formed at the rear end of the raised portion 24. The cover is held in its closed position by latches 26, one on either side thereof, and has at its lower rear extremity a tail portion 28 extending below the hinge 18 and adapted, when the cover is raised to an upstanding position, to engage the underside of the raised portion 24 of the base so as to support the cover in such upstanding position.

When the cover is thus raised to an upstanding position, the suction unit 10 and filtering unit 12 will be substantially completely exposed above the base 14, for servicing operations, such as for example, removal and replacement of the carbon brushes 30 of the suction unit 10, or removal of the screws 32 by means of which the suction unit 10 is attached to supporting brackets 34 and 35.

The filtering unit 12 includes a receptacle 20, a perforated liner 36 encircling and supporting the lateral wall of the receptacle 20, and a tubular casing 38 encircling and spaced from the liner 36. At the upper end of the casing 38 is an annular channel 40 in which is mounted a ring 42 of compressible material such as, for example, soft rubber, and the receptacle 20, which is preferably of porous paper so that it may be disposed of when filled, is provided at its upper end with a non-porous flange 44 resting upon the packing ring 42. The cover 16 is formed with an annular clamping flange 46 adapted to clamp the flange 44 against the packing ring 42, and with a delivery nozzle 48 receivable in a central opening 50 in a non-porous top member 52 which is secured to the receptacle 20. The top member 52 may be connected integrally with the flange 44 by an offset portion 54 by means of which the top member is stitched to the receptacle 20. The nozzle 48 carries a sealing ring 56 of compressible material such as soft rubber, which is adapted to seal the nozzle to the top 52. The parts are so arranged that the sealing of the nozzle 48 to the top 52 and the clamping of the flange 44 against the packing ring 42 is effected by moving the cover 16 to a closed position and latching it in that position. Conversely, the raising of the cover 16 to the vertical position uncovers the filtering unit so that a filled receptacle 20 may be removed and replaced by a fresh receptacle.

Formed in the cover 16 is an inlet 58 which is connected to the nozzle 48 by a short duct 60. A cleaning tool (not shown) is adapted to be connected to the filtering unit 12 by a flexible suction tube 66 having on one end a suitable connector 68 for connection to the inlet 58. The connector 68 may if desired incorporate a swivel to permit swiveling of the tube 66 relative to the body of the cleaner. Suitable means, such as a latch 69, may be employed for connecting the hose to the inlet 58 in such a manner as to form a draft connection by means of which the cleaner body may be pulled around at the end of the tube 66.

The casing 38 of the filtering unit 12 is mounted at its lower end on an annular flange 70 formed integrally with the base 14 and constituting one end of a duct 72 adapted to apply suction to the lower end of the casing 38, which is open and in communication with an annular port defined by the flange 70. Suitable attaching elements, such as screws 62, extending upwardly through the base 14 and flange 70 and threaded into an inturned flange 64 on the lower end of the casing 38, may be employed for securing the casing 38 to the flange 70.

The other end of the duct 72 is extended diagonally upwardly and rearwardly as at 73 and terminates in an annular end surface 74 lying in a plane inclined upwardly and forwardly.

The suction unit 10 includes an electric motor having a casing 78 to one end of which is attached the fan casing 84. The other end of the motor casing 78 is attached to the upper end surface 74 of the duct portion 73 as by means of screws 82 extending through the base 14 and threaded into the casing 78. A gasket 83 of vibration absorbing material is preferably interposed between the casing 78 and the duct portion 73. Casing 78 has an inlet port 76 communicating with the duct portion 73. Encircling and secured to the casing 78 is an annular vibration absorbing mounting 80 which is attached to the brackets 34 and 35 by the screws 32 as previously stated, and which thus forms the means for mounting the suction unit upon the base 14, the bracket 34 being secured directly to the base 14 and the bracket 35 being secured to one side of the filter unit casing 38.

The suction unit 10 is arranged on an axis which is inclined upwardly and rearwardly from the duct portion 73. An important advantage of this arrangement lies in the fact that it provides for maximum closeness of coupling between the inlet 76 of the suction unit and the open lower end of the filter casing 38, thus increasing the suction efficiency of the cleaner. A further advantage of the arrangement arises from the disposition of the fan housing 84 at such an angle as to make available for it a space of maximum extent in the plane of its radii. This becomes important where it is desired to increase the suction of the unit by increasing the diameter of the fan casing. It also provides necessary space for accommodating a shroud of the type disclosed in the companion application, Serial No. 503,918, being filed simultaneously herewith, in the name of J. H. Nuffer and L. H. Latta. A further advantage is the positioning of the end of the fan housing adjacent and substantially parallel to the inclined rear wall of the cover 16 so as to provide for the novel and improved blower outlet arrangement which will now be described.

The upper end wall 85 of the fan casing 84 is provided with an annularly arranged series of discharge openings 86. Adjacent the inner side of the wall 85 is a valve disc 87 which has a corresponding annular series of openings 88 adapted to normally register with the openings 86, but which may be rotated to a closed position wherein the openings 86 are closed by the portions of the valve disc 87 between the openings 88. In this closed position, the valve disc 87 will be sealed against the inner surface of the wall 85 by the pressure of the air being discharged from the fan. The disc 87 is attached to the lower end of an outlet tube 89 which extends outwardly through an opening 90 in the cover 16 and is freely rotatable therein. The outlet tube 89 is adapted to receive connector 68 of the suction tube 66 as indicated in dotted lines in Fig. 1, and the connector 68 may, if desired, be formed with some conventional means for locating it in only one position in the tube 89 so that the latch 69 may, in connection with suitable indicating marks on the exterior surface of the cover 16, indicate the proper open and closed positions of the valve.

With the valve closed, the discharge is delivered through the tube 89, whereas normally the major portion of the discharge will be delivered through the openings 86 and 88. By providing a cap to normally close the tube 89, all of the normal discharge may be delivered through the openings 86 and 88.

The noise of the normal air discharge may be muffled by a fabric hood 92 enclosing the end of the fan casing 84. By using the hood 92 and a cap for the end of the tube 89, relatively noiseless operation may be attained. The air is discharged noiselessly from the chamber 17 through louvers 98 in the side walls of the cover 16, providing large discharge area.

The latches 26 cooperate with lugs on the base 14 and are so located as to exert against the cover 16 a downward pull which is centered in the transverse plane of the vertical axis of the filtering unit 12, and which is effective to seal the flange 44 tightly against the packing ring 42 throughout the circumference of the latter. The engagement of the flange 46 against the resiliently supported flange 44 will normally suffice to provide a vibration clamping support of the cover 16, but in some instances it may be desirable to employ cushioning buttons 91 on the base 14, engaged by lugs 93 on the cover 16.

A window 99 may be provided in the duct 60, in order that the operator may view the dust stream flowing through the duct 60.

Figure 4:
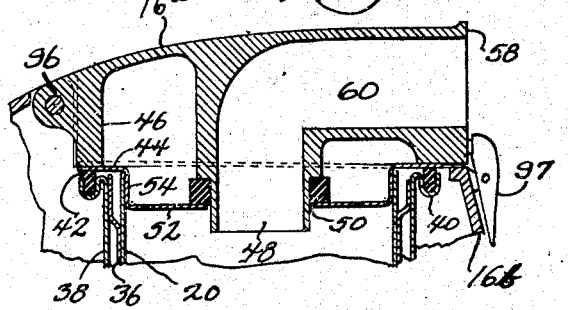
Fig. 4 is a sectional view of a modified form of the invention.

In the modified form of the invention shown in Fig. 4 a separate cover section 16—a is provided for the filtering unit 12, the cover 16—a being hinged at 96 to the cover section 16—b, which is cut away to receive the section 16—a. The outlet 58, duct 60, nozzle 48 and flange 46 are formed in the cover section 16—a. A latch 97, pivoted to the section 16—b, engages the section 16—a to latch the latter in closed position. The section 16—b may, in this form of the invention, be detachably secured to the base 14 by any suitable means such as screws, and the hinge 18 and latches 26 eliminated.

We claim as our invention:

In a suction cleaner, a base having a duct formed at one end with an upwardly opening inlet and at its other end with an upwardly inclined outlet, a filtering unit including an imperforate outer casing mounted upon the inlet portion of the duct and extending upwardly, a suction unit having an inlet end attached to said outlet portion of the duct, said suction unit extending upwardly at an acute angle to the base, said filtering unit including a perforated liner within said imperforate casing and spaced therefrom and a porous dust collecting receptacle within said perforated liner, and a cover cooperating with said base to form a housing enclosing said suction and filtering units and adapted to be moved to a position wherein said units are exposed for servicing operations, said cover being formed with a nozzle adapted, when the cover is closed, to establish communication with said receptacle, and with means adapted to cooperate with said receptacle to clamp the same in supported relation in said imperforate casing, and an inlet communicating with said nozzle, to which a flexible tube may be attached for pulling the cleaner about upon a surface being cleaned.

JOSEPH H. NUFFER.
LYNN H. LATTA.